(12) United States Patent
Zhang et al.

(10) Patent No.: US 11,238,551 B2
(45) Date of Patent: Feb. 1, 2022

(54) POINT-BASED LICENSE SHARING

(71) Applicant: INTERNATIONAL BUSINESS MACHINES CORPORATION, Armonk, NY (US)

(72) Inventors: Jian Zhang, Beijing (CN); Mu Dan Cao, Beijing (CN); Wu Weilin, Beijing (CN); Yi Bin Wang, Beijing (CN); Guo Ning Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/823,671

(22) Filed: Nov. 28, 2017

(65) Prior Publication Data

US 2019/0164242 A1    May 30, 2019

(51) Int. Cl.
*G06Q 20/12* (2012.01)
*G06Q 50/18* (2012.01)
(Continued)

(52) U.S. Cl.
CPC ........... *G06Q 50/184* (2013.01); *G06Q 20/06* (2013.01); *G06Q 20/1235* (2013.01); *H04L 47/82* (2013.01)

(58) Field of Classification Search
CPC .. G06Q 50/184; G06Q 20/1235; G06Q 20/06; H04L 47/82
See application file for complete search history.

(56) References Cited

U.S. PATENT DOCUMENTS

| | | |
|---|---|---|
| 8,380,837 B2 | 2/2013 | Dawson et al. |
| 8,474,027 B2 | 6/2013 | Meijer et al. |
| 8,589,312 B2 | 11/2013 | Sood et al. |
| 8,612,599 B2 * | 12/2013 | Tung .................. H04L 41/5009 709/226 |
| 9,569,598 B2 | 2/2017 | Abuelsaad et al. |

(Continued)

FOREIGN PATENT DOCUMENTS

WO    WO-2011144631 A1 *  11/2011    ......... H04L 67/1008

OTHER PUBLICATIONS

Charles Rex Arbogast, "Groupon offering credits for unredeemed vouchers", Nov. 6, 2015, ABC7 News. (Year: 2015).*

(Continued)

*Primary Examiner* — Neha Patel
*Assistant Examiner* — Duan Zhang
(74) *Attorney, Agent, or Firm* — Schmeiser, Olsen & Watts, LLP; Nicholas L. Cadmus

(57) ABSTRACT

Systems, methods and tools directed toward point-based license sharing mechanism that allows resource providers to dynamically control the computing resources each customer consumes by assigning point values to the license agreements between the customers and resource providers. Customers can select the amount of available points in a personalized license agreement and instead of using a "pay as you go" model, the customer upgrades and downgrades resources and services through point transfers which convert points into the resources Using the point-based conversions, customers have greater control over each license without inadvertently spending more money than expected on resources because the resources are limited to the available points in the license agreement, unless the licenses are purposefully upgraded by user. User licenses may offer flexible options to dynamically de-provision unused or unwanted resources back into available points for reallocation of new resources that may currently be more important to the user.

16 Claims, 13 Drawing Sheets

(51) Int. Cl.
*G06Q 20/06* (2012.01)
*H04L 12/911* (2013.01)

(56) References Cited

U.S. PATENT DOCUMENTS

| | | | | |
|---|---|---|---|---|
| 2006/0271423 | A1* | 11/2006 | Hiranoya | G06Q 30/02 |
| | | | | 705/14.26 |
| 2007/0198421 | A1* | 8/2007 | Muller | G06Q 10/10 |
| | | | | 705/52 |
| 2008/0083040 | A1 | 4/2008 | Dani et al. | |
| 2010/0050172 | A1 | 2/2010 | Ferris | |
| 2011/0131315 | A1 | 6/2011 | Ferris et al. | |
| 2013/0312112 | A1* | 11/2013 | Troiano | H04N 21/8355 |
| | | | | 726/27 |
| 2013/0318232 | A1* | 11/2013 | Kamath | H04L 67/1002 |
| | | | | 709/224 |
| 2015/0336005 | A1* | 11/2015 | Melnick | A63F 13/73 |
| | | | | 463/29 |
| 2017/0161470 | A1 | 6/2017 | Feng | |
| 2019/0108542 | A1* | 4/2019 | Durvasula | G06Q 20/3829 |

OTHER PUBLICATIONS

McRoberts, Malcolm; Software Licensing in the Cloud; The International Journal of Soft Computing and Software Engineering, vol. 3, No. 3, Special Issue; The Proceeding of International Conference on Soft Computing and Software Engineering; Mar. 20213; pp. 395-402.

Shrivastava, Shailesh Kumar et al.; Impact of Software Licenses in Cloud Computing Based E-Governance Initiatives; 2014 Fourth International Conference on Communication systems and Network Technologies; Apr. 7-9, 2014; 2 pages (Abstract).

Mell, Peter et al.; "The NIST Definition of Cloud Computing;" National Institute of Standards and Technology; Special Publication 800-145; Sep. 2011; 7 pages.

Malcolm McRoberts, Solving the Impact of Cloud Computing on Software Licensing Models, The International Journal of Soft Computing and Software Engineering [JSCSE], vol. 3, No. 3, Special Issue: The Proceeding of International Conference on Soft Computing and Software Engineering 2013 [SCSE'13], San Francisco State University, CA, U.S.A., Mar. 2013 Doi: 10.7321/jscse. v3.n3.60 e-ISSN: 2251-7545, pp. 395-402.

* cited by examiner

POINT-BASED LICENSE SHARING

TECHNICAL FIELD

The present disclosure relates generally to systems, methods and tools for licensing the consumption and distribution of computing resources.

BACKGROUND

A cloud computing environment allows for resources to be abstracted and provisioned by a cloud layer to an end user by administrators of the cloud. The abstraction of cloud computing environments make disparate groups of computing devices appear to an end-user as a single pool of seamless resources. Each of these computing devices may provide resources which may include physical or logical computing engines, servers, physical or virtual memory, storage, processing power, networks, business applications and other software, and the like.

Cloud computing and associated cloud services have quickly become widely available and are becoming a standard service delivery mechanism for businesses of all sizes. Under a cloud computing environment, licenses may play an integral role in obtaining software, services and other computing resources. Licensing can involve complex issues. In order to control and administer software at all layers of the cloud stack, requirements may be enforced by many companies for the use of software and virtual hardware resources via an associated license. For example, licenses for operating systems; middleware; databases; virtualization; and/or applications. Each of these software products operate on various levels within the cloud architecture.

SUMMARY

A first embodiment of the present disclosure provides a method for licensing computing resources to customers comprising the steps of: receiving, by a processor, a resource request associated with a license file of a user, wherein the license file comprises an amount of available point-based currency that is exchangeable for computing resources; validating, by the processor, the license file; verifying, by the processor, that the resource request follows a basic policy of the license file and the amount of available point-based currency of the license file is greater than or equal to an amount of point-based currency sufficient for exchanging the computing resources requested by the resource request; transforming, by the processor, the available point-based currency into an amount of consumed point-based currency in exchange for each requested resource as a function of a transformation rule; provisioning, by the processor, the computing resources to the customers associated with the license file; and updating, by the processor, the amount of available point-based currency in real-time to as a function of the transforming step.

A second embodiment of the present disclosure provides a computer system comprising a processor; a memory device coupled to the processor; and a computer readable storage device coupled to the processor, wherein the storage device contains program code executable by the processor via the memory device to implement a method for licensing computing resources to customers comprising the steps of: receiving, by the processor, a resource request associated with a license file of a user, wherein the license file comprises an amount of available point-based currency that is exchangeable for computing resources; validating, by the processor, the license file; verifying, by the processor, that the resource request follows a basic policy of the license file and the amount of available point-based currency of the license file is greater than or equal to an amount of point-based currency sufficient for exchanging the computing resources requested by the resource request; transforming, by the processor, the available point-based currency into an amount of consumed point-based currency in exchange for each requested resource as a function of a transformation rule; provisioning, by the processor, the computing resources to the customers associated with the license file; and updating, by the processor, the amount of available point-based currency in real-time to as a function of the transforming step.

A third embodiment of the present disclosure provides a computer program product comprising one or more computer readable hardware storage devices having computer readable program code stored therein, said program code containing instructions executable by one or more processors to implement a method for licensing computing resources to customers comprising the steps of: validating, by the processor, the license file; verifying, by the processor, that the resource request follows a basic policy of the license file and the amount of available point-based currency of the license file is greater than or equal to an amount of point-based currency sufficient for exchanging the computing resources requested by the resource request; transforming, by the processor, the available point-based currency into an amount of consumed point-based currency in exchange for each requested resource as a function of a transformation rule; provisioning, by the processor, the computing resources to the customers associated with the license file; and updating, by the processor, the amount of available point-based currency in real-time to as a function of the transforming step.

DETAILED DESCRIPTION

Figure 1:
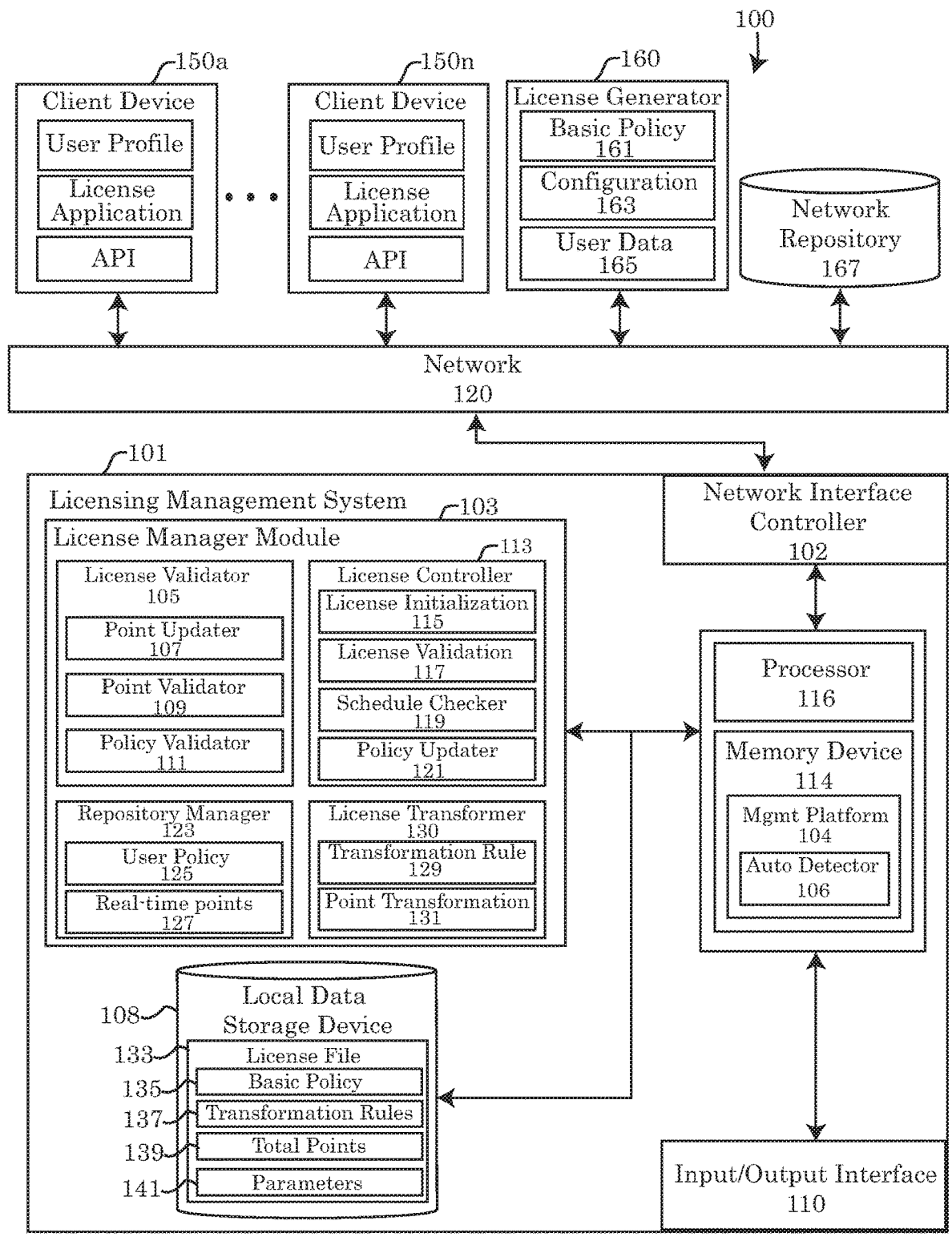
FIG. 1 depicts a block diagram of an embodiment of a system for licensing computing resources to customers.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Traditionally, license management mechanisms for information technology (IT) environments focus on controlling and restricting the usage of specific computing resources, such as hardware, software, virtualization, services and storage resources. Licenses to customers utilizing computing resources may control and restrict how many CPUs a customer may use, the amount of memory that may be available, the amount of storage space, the number of virtual machines that may be accessible as well as the types and features of software that may be enabled for each customer. In a public cloud computing environment, a customer may not be required to buy all the hardware and licenses to certain software. Rather, each of the resources provided to the customer may be under a "pay as you go" pricing model that provides the customer with infrastructure as a service (IaaS), platform as a service (PaaS) and/or software as a service (SaaS). However, under the pay as you go pricing model, customers should be careful when requesting and utilizing resources. Over utilizing resources in the pay as you go model can become quite a bit more expensive if a customer is does not carefully control resource consumption.

The issue of license management and resource provisioning in a cloud environment is a gradually maturing area in which many challenges still exist that are not adequately addressed by currently available solutions. Embodiments of the presently disclosed systems, methods and tools recognize the short comings of traditional "pay as you go" resource licensing, including the expense that may be inadvertently incurred and/or the rigid or inflexible manner in which consumers are unable to return un-needed resources. Embodiments of the present disclosure are directed toward a unified and transferable point-based license sharing mechanism which may allow for resource providers to dynamically control how each customer consumes computing resources (i.e. hardware, software, virtualization, storage, services, etc.) by assigning point values to the license agreements between the customers and resource providers. Customers may be able to select the amount of available points in a personalized license agreement, based on the expected computer resource needs of the customer. Instead of using a "pay as you go" model, the customer upgrades and downgrades services through point transfers which convert available points into resources that are subsequently delivered to the users by the resource administrators. Using the point-based conversions, customers may not exceed their license without actively upgrading the license to obtain more points to spend on additional resources, thus controlling providing a mechanism for licensees to control resource acquisition expenses.

Embodiments of the present disclosure enable customers to assign certain portions of the license points to one or more particular resources, prioritizing the resources most important to the customer. Embodiments of the present disclosure allow customers to retrieve any amount of the total license points with or without depreciation to the points and re-assign the points to other resources that may be provided by the resource provider and thus available to the customer (provided the customer has enough total points available). By being able to convert the points allocated by the license back and forth into different types of computing resources as needed by the customer, the point-based licensing mechanism offers both the resources provider and the customer consuming the resources, a wide degree of flexibility to control the usage of the resources obtained.

System for Licensing Computing Resources

Figure 2:
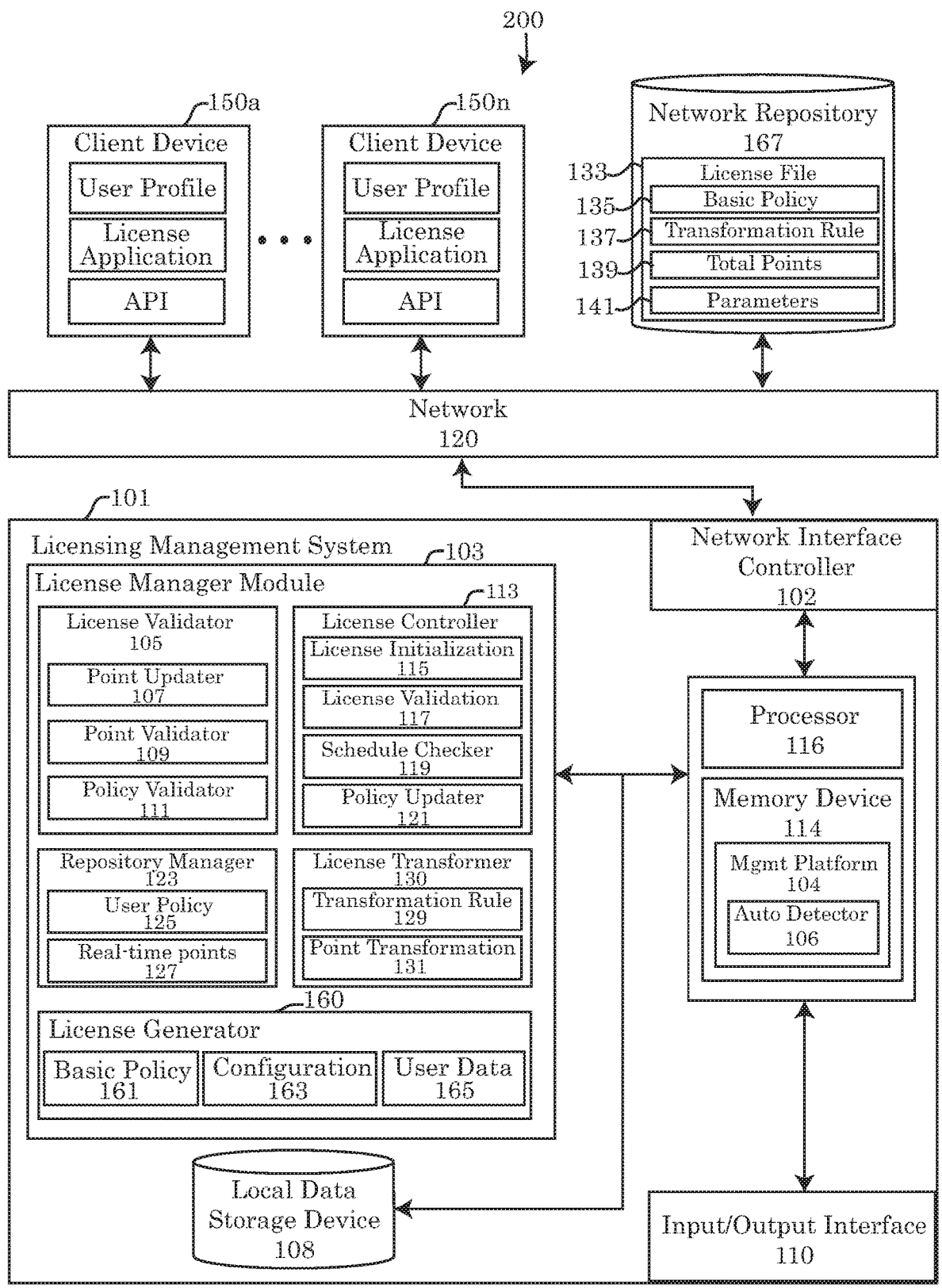
FIG. 2 depicts an alternative embodiment of a system for licensing computing resources to customers.

Referring to the drawings, FIGS. 1-2 illustrate diagrams of embodiments of a system 100, 200 for licensing computing resources to customers, consistent with the disclosures of this application. Embodiments of systems 100, 200 may comprise one or more specialized computer systems each having a specialized configuration of hardware, software or a combination thereof, as depicted in FIGS. 1-6 and as described throughout the present disclosure. Embodiments of each specialized computing system, including the licensing management system 101, client devices 150a to 150n (hereinafter client device 150) and license generator 160, may each comprise one or more elements of the generic computer system 1100 of FIG. 11, described in detail below. The elements of the generic computer system 1100 may be integrated into each of the specialized computer systems that make up the systems 100, 200 for licensing computing resources to customers as described herein. Each of the computer system which make up systems 100, 200 may also be configured to include one or more processors 116, specialized hardware or circuitry and/or software loaded in the memory device 114 of the computer system which may perform specific functions, tasks and routines relating to the licensing of computing resources to customers as described in further detail below.

Embodiments of the computer systems of system 100, 200, including the license management system 101, license generator 160, network repository 167 and each client device 150, may be connected and placed in communication with one another (as well as additional computer systems or hardware), over a computer network 120. Embodiments of the network 120 may be constructed using wired or wireless connections between each piece of hardware or virtualized hardware connected to the network 120. As shown in the exemplary embodiment of FIGS. 1-2, each of the computer systems in systems 100, 200 may connect to the network 120 using a network interface controller (NIC) 102 or other network communication device. Embodiments of the NIC 102 may implement specialized electronic circuitry allowing for communication using a specific physical layer and a data link layer standard, such as Ethernet, Fiber channel, Wi-Fi or Token Ring. The NIC 102 may further allow for a full network protocol stack, enabling communication over network 120 to the group of computer systems or other computing hardware devices linked together through communication channels.

Embodiments of the network 120 may facilitate communication and resource sharing among each computer system as well as additional hardware devices connected to the network 120, for example a network repository 167 or other network accessible storage devices connected to the network 120. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments, the network 120 and management of licensing of computing resources to customers may be performed using a cloud computing environment 50. Cloud computing is a model of service delivery enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. For example, using the licensing mechanism described throughout this application. The cloud model may include at least five characteristics, at least three service models, and at least four deployment models. The characteristics of the cloud computing model may be described as follows:

On-demand self-service: a cloud customer can unilaterally provision computing capabilities, such as server time and network storage, as needed automatically without requiring human interaction with the service's provider.

Broad network access: capabilities are available over a network 120 and accessed through standard mechanisms that promote use by heterogeneous thin or thick client platforms (e.g., mobile phones, laptops, and PDAs).

Resource pooling: the cloud provider's computing resources are pooled to serve multiple customers using a multi-tenant model, with different physical and virtual resources dynamically assigned and reassigned according to demand and the licenses obtained by the customers. There is a sense of location independence in that the customer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the customer, the capabilities available for provisioning often appear to be unlimited and can be purchased in any quantity at any time by updating the customer's license and basic policy as describe below, increasing or decreasing a total amount of the point-based currency spent on provisioning and de-provisioning resources to each customer.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and customer of the utilized service.

The service models under a cloud computing environment may be described as follows:

Software as a Service (SaaS): the capability provided to the customer is to use the provider's applications running on a cloud infrastructure. The applications are accessible from various client devices 150a, 150b, 150c . . . 150n through a thin client interface such as a web browser (e.g., web-based e-mail). The customer does not manage or control the underlying cloud infrastructure including network, servers, operating systems, storage, or even individual application capabilities, with the possible exception of limited user-specific application configuration settings.

Platform as a Service (PaaS): the capability provided to the customer is to deploy onto the cloud infrastructure customer-created or acquired applications created using programming languages and tools supported by the provider. The customer does not manage or control the underlying cloud infrastructure including networks, servers, operating systems, or storage, but has control over the deployed applications and possibly application hosting environment configurations.

Infrastructure as a Service (IaaS): the capability provided to the customer is to provision processing, storage, networks, and other fundamental computing resources where the customer is able to deploy and run arbitrary software, which can include operating systems and applications. The customer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 5:
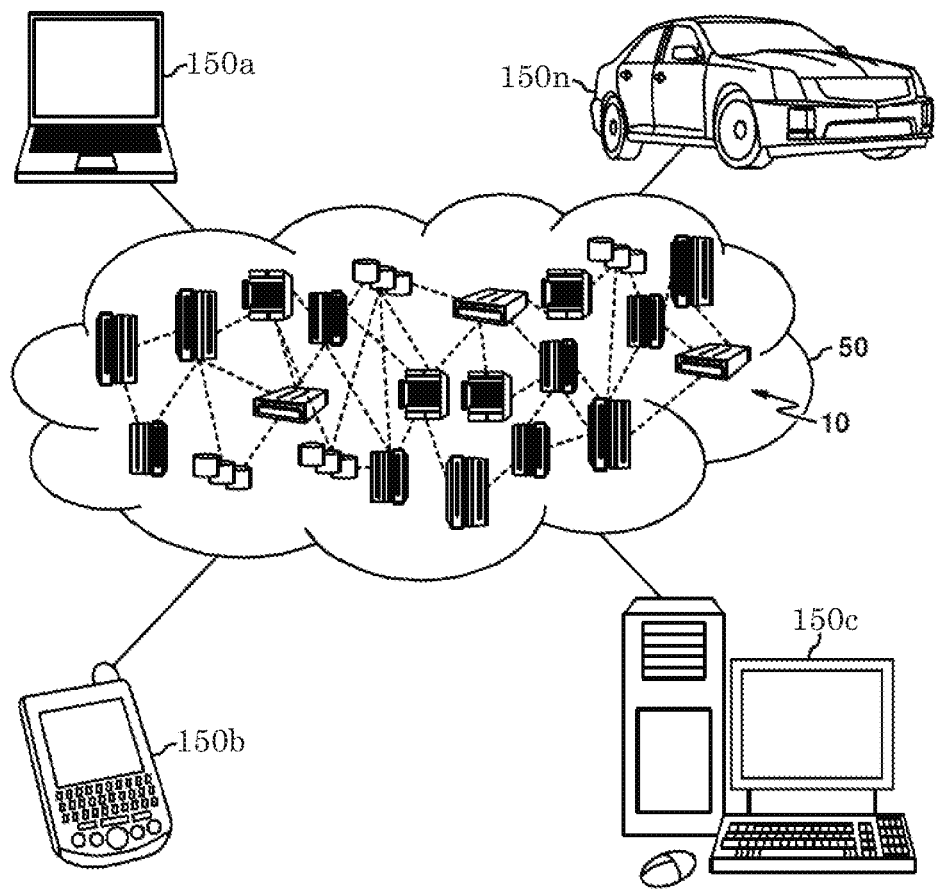
FIG. 5 depicts an embodiment of a cloud computing environment that may operate as a system for licensing computing resources to customers

A cloud computing environment 50 may be service oriented with a focus on statelessness, low coupling, modularity, and semantic interoperability. At the heart of cloud computing is an infrastructure that includes a network 120 of interconnected nodes 10. Referring to the drawings, FIG. 5 is illustrative of a network 120 operating as a cloud computing environment 50. As shown, the cloud computing environment 50 may include one or more cloud computing nodes 10 with which client devices 150 used by cloud customers, such as, for example, desktop computers 150c, laptop computers 150a, and mobile communication devices 150b, tablet computers or computer systems integrated into devices 150 as exemplified by the vehicle shown in FIG. 5.

Each node 10 of the cloud computing environment 50 may communicate with one another or may be grouped (not shown) physically or virtually, in one or more networks, such as Private, Community, Public, or Hybrid clouds as described hereinabove, or a combination thereof, allowing for the cloud computing environment 50 to offer infrastructure, platforms and/or software as services for which a cloud customer does not need to maintain resources on each client device 150. It is understood that the types of client devices 150 as shown in FIGS. 1-2, 5-6 are intended to be illustrative only and that nodes 10 of a cloud computing environment 50 can communicate with any type of computerized device over any type of network 120 and/or network addressable connection (e.g., using a web browser).

Figure 6:
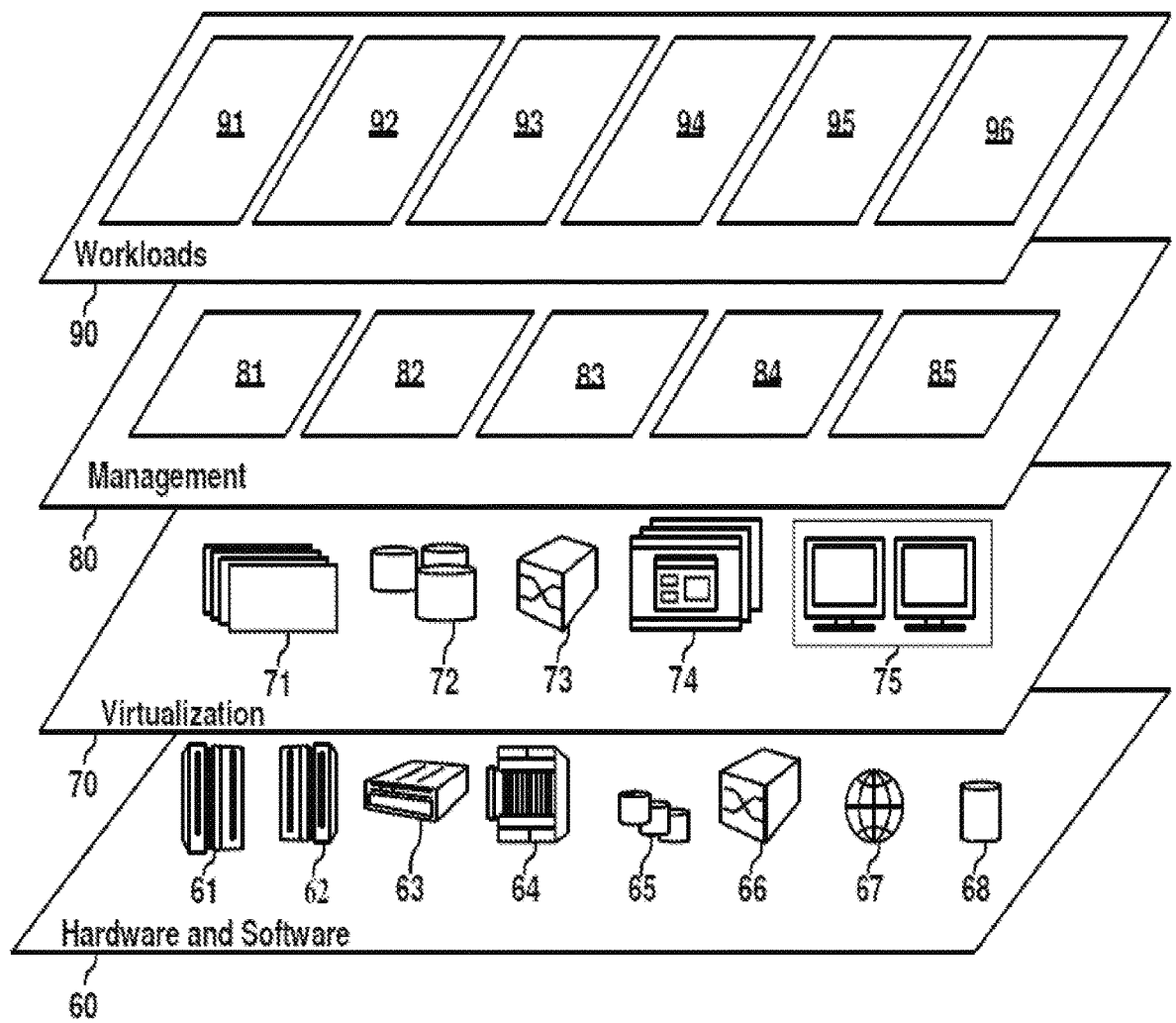
FIG. 6 depicts an embodiment of one or more abstract layers of the cloud computing environment of FIG. 5.

Referring now to FIG. 6, a set of functional abstraction layers provided by a cloud computing environment 50 of the network 120 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Embodiments of the management layer 80 may provide the functions described below. Resource provisioning 81 provides dynamic procurement of computing resources in accordance with each of the licenses of each customer and resource provisioning 81 may be utilized to perform tasks within the cloud computing environment. Metering and Pricing 82 provide cost tracking as resources are procured and utilized within the cloud computing environment, and billing or invoicing for consumption of these resources as point-based currency is transformed into computing resources. In one example, these resources may include virtualized hardware, virtual machines (VMs) and/or application software licenses. Security provides identity verification for cloud customers and tasks, as well as protection for data and other resources. User portal 83 provides access to the cloud computing environment 50 of the network 120 for customers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workload layer 90 provides examples of functionality for which the cloud computing environment 50 may be utilized. Examples of workloads and functions which may be provided from this layer include: records management 91; web page management 92; searching and results management 93; data analytics processing 94; profile management 95; and management platform 104.

Referring back to the drawings, FIG. 1 depicts an embodiment of a system 100 for licensing computing resources to customers through network 120. Licenses that may control the provisioning and de-provisioning of computing resources over the network 120 may be managed, controlled, updated and verified by a license management system 101. The license management system 101 may operate as a central node or server on the network 120 and may be responsible for validating license files 133 corresponding to one or more user profiles 151*a* . . . 151*n* (referred to collectively as user profiles 151), fulfilling resource requests to provision or de-provision computing resources for specific license files 133, tracking and updating an amount of points used as a point-based currency exchanged by users for provisioning/de-provisioning computing resources, as well as updating the basic policy of the users in accordance with the level of service or resources selected by the policy holders.

Embodiments of the license management system 101 may include specialized hardware and/or software integrated into the license management system 101 performing each of the functions of the license management system relating to control, validate, update and transform the point-based currency, basic policies and computing resources in accordance with the licenses of the users and/or licensees of the computing resources provided by the license management system 101. The specialized components of the license management system 101 implementing each function or task may be part of a license manager module 103. The hardware and/or software components of the license manager module 103 may include one or more sub modules in some embodiments. These sub modules may include a license validator 105, license controller 113, repository manager 123 and license transformer 130. As used herein, the term "module" may refer to a hardware module, software-based module or a module may be a combination of hardware and software resources of a computer system and/or resources remotely accessible to the computer system of system 100, 200 via the computer network 120.

Embodiments of the modules described in this application, whether comprising hardware, software or a combination of resources thereof, may be designed to implement or execute one or more particular functions, tasks, services or routines of the license management system 101, client device 150, license generator 160 or network repository 167 described herein. Embodiments of hardware-based modules may include self-contained components such as chipsets, specialized circuitry and one or more memory devices comprising a memory storage medium (described below). A software-based module may be part of a program code or linked to program code or computer code 1197, 1198 containing specific programmed instructions loaded into a memory device 114 of the license management system 101, and/or a remotely accessible memory device 114 of a network accessible computer system accessed over the network 120. For example, in some embodiments the network accessible computer system connected to the license management system 101 may be a web server, application server, client device 150, network accessible hardware such as a network repeater repository 167 or a computer system running a particular application such as a license generator 160.

Figure 3:
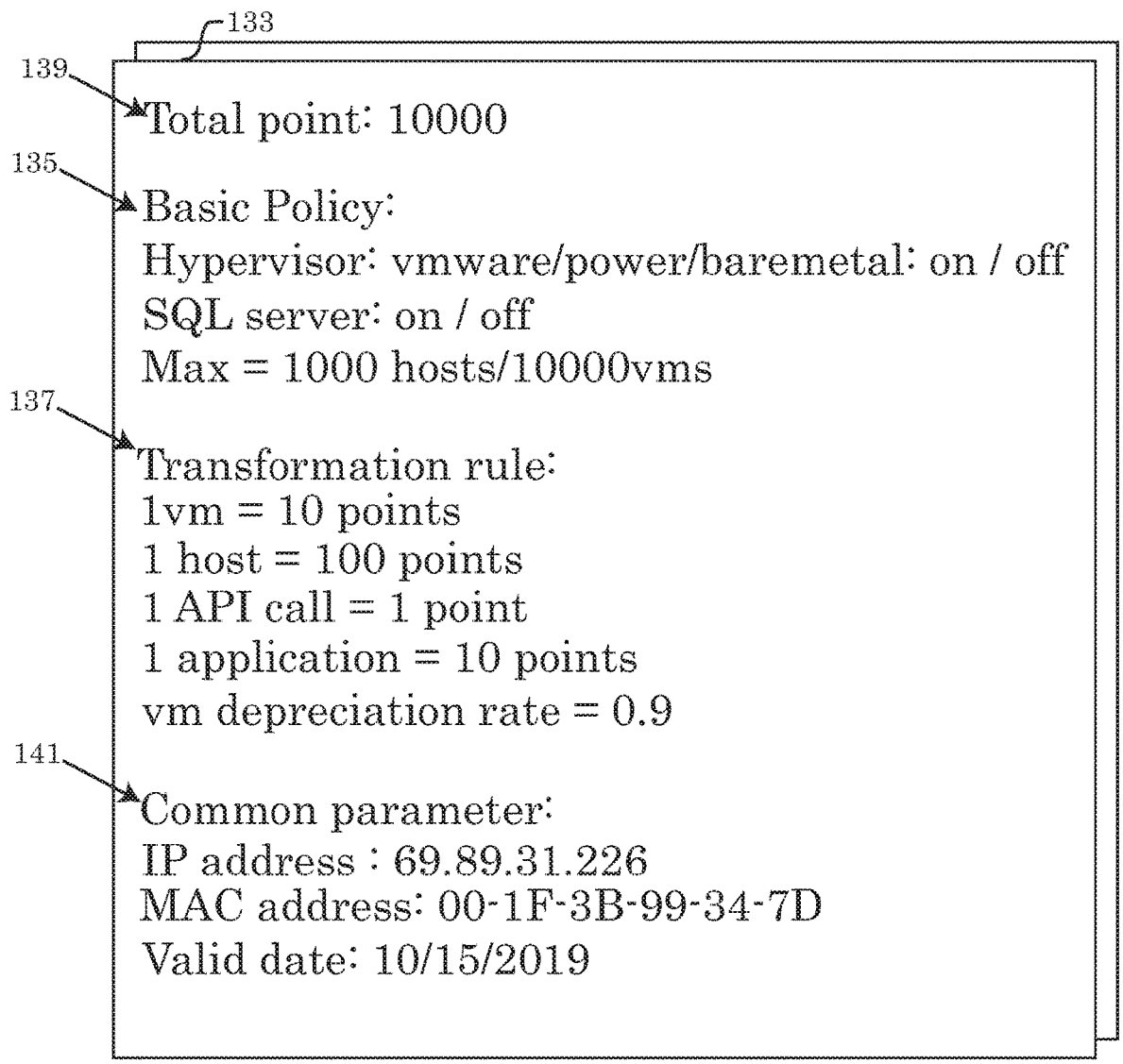
FIG. 3 illustrates an embodiment of a license file generated for licensing computing resources to customers.

Embodiments of the license management system 101 may include a license validator 105. The license validator 105 may perform functions and/or tasks relating to the validation of computing resource changes in accordance with total points 139 of point-based currency (hereinafter simply referred to as "points") and the basic policy 135 stored in the license file 133. An example of a license file 133 is depicted in FIG. 3 of the current application. The license file 133 may store data relating to a user's license for obtaining computing resources from the license management system 101 as well as common parameters 141 of the client devices 150 and users having access to the computing resources licensed by the license file. For example, the license file 133 may describe the total points 139 of point-based currency that a license may exchange for computing resources, the basic policy 135 of the license which may describe the types of resources and maximum amounts of resources obtainable through the license. For instance, embodiments of the basic policy may describe accessible amounts of virtual machines (VMs) that may be obtained, total storage space, processing power, memory, accessible software applications, hosting services, etc. Moreover, the common parameters 141 that may be collected and stored by the license file may include one or more IP addresses, MAC addresses of computing systems and client devices 150 capable of accessing the licensed resources, and an expiration date describing how long the license file is considered valid for accessing the computing resources provided to the user.

In some embodiments of the license file 133, the license file 133 may include a set of transformation rules 137. The transformation rules 137 may describe the conversion rate between specific computing resources and the amount of points that may be exchanged in order to obtain each computing resource. FIG. 3 provides an example of transformation rules 137 that may be present in a license file 133. For instance, in the example provided, obtaining one virtual machine costs an exchange of 10 points, one host costs 100 points, performing an API call is 1 point, purchasing an application is 10 points and recycling virtual machines in exchange for points will yield a return rate of 90% (0.9) for the virtual machines de-provisioned. These are merely examples, any point amounts may be assigned to any type of computing resource that may be available to the users of the system 100, 200.

Embodiments of the license validator 105 may include a point updater 107, point validator 109 and/or a policy validator 111. Embodiments of the point updater 107 may perform system calls to the repository manager 123 (described below) instructing the repository manager 123 to increase or decrease the number of total points 139 available in the license file 133 as a function of the exchange of computing resources for point-based currency resulting in the provisioning or de-provisioning of computing resources as a result of the exchange.

Embodiments of the point validator 109 verifies the validity of the points being exchanged as a currency for computing resources. Once the point validator 109 has confirmed that the points being exchanged for computing resources are valid, the point validator may perform a system call to the license transformer 130 instructing the license transformer 130 to convert the validated points into consumed points in exchange for the computing resources (preventing a user from reusing the same points multiple time without first de-provisioning the received computing resources). The point validator 109 may obtain the number of currently available points (i.e. the total points 139) from the repository manager 123. If the amount of available points is NOT less than the total amount of points required points to fulfill the resource request, the point validator 109 may perform a system call to the repository manager 123 instructing the repository manager to decrease the available total points 139 of the license file accordingly and record the point detailed usage via the real-time points management of the repository manager 123.

In some embodiments of system 100, 200 the license validator 105 may further comprise a policy validator 111. Embodiments of the policy validator 111 verify the validity of the basic policy 135 and may ensure that the resource requests made by the users of the client devices 150 comport to the rules of the basic policy 135. If the resource requests made by the user do not follow the basic policy 135, the policy validator 111 may discard the resource request and record in a log file or other recordation, the discarded requests that do not comply with the basic policy 135. Conversely, once the resource request is verified to comply with the basic policy 135, the resource request may be passed to the point validator 109 to ensure that the point-based currency being consumed is sufficient to complete the resource request.

In some embodiments of the license manager module 103, the license manager module 103 may comprise a license controller 113. The license controller 113 may act as an interface between users of the client devices 150 making resource requests and the remaining components of the license management system 101. The license controller 113 may perform functions and tasks relating to the acceptance and execution of resource requests, checking the validity of a user's license, checking the available points of a user's license and updating a user's basic policy 135 in conjunction with the repository manager 123.

Embodiments of the license controller 113 may include additional sub components, as depicted in the systems 100, 200 of FIGS. 1-2. For example, in some embodiments, the license controller 113 may include license initialization 115, license validation 117, a schedule checker 119 and a policy updater 121. Upon initial startup of the license manager module 103 by client device 150, the license controller 113 may perform a system call to start license initialization 115. Embodiments of the license initialization 115 may load the license file 113 which may be stored by a local data storage device 108 in some embodiments or a network repository 167 in alternative embodiments. License initialization 117, may load the license file 133 into the memory device 114 of the license management system 101 and proceed to validate the license file using license validation 117 to verify that the license is valid and/or unexpired. For example, the license validation 117 may check the parameters 141 of the license file 133 for a valid digital signature, a matching IP or MAC address between the license file 133 and the client device 150 as well as compare the current date with the expiration date of the license.

As a result of the initialization and validation of the license file 133 by the license controller 113, the license controller 113 may identify the license file 133 as a valid or invalid license. The identification of an invalid license file 133 by the license controller 113 may result in the license controller 113 preventing the client device 150 making the resource request from accessing any additional features of the license manager module 103. The licenser controller 113 may prevent the license manager module 103 from starting one or more components, modules or services maintained by the license manager module 103. Conversely, if the license controller 113 verifies the authenticity and validity of the license file 133, the license controller 113 may proceed by allowing the user of the client device 150 to access the features of the license manager module 103 consistent with the user's basic policy 135 and engage in fulfilling resource requests made by the user of the client device 150.

In some embodiments, the license controller 113 may periodically verify the validity of the license file 133 being accessed by a user of a client device 150 connected to the license management system 101. A schedule checker 119 may be employed to periodically engage the license validation 117 service to re-validate the license file. The schedule checker 119 may initiate the re-validation process randomly in some embodiments; while in alternative embodiments revalidate the license file 133 at regular, pre-programmed intervals of time. During the re-validation process, the license validation 117 service may or may not find the license file 133 to be invalid. If the license file 133 is not found to be invalid by the schedule checker's 119 initiated revalidation, the license manager module 103 may continue to operate uninterrupted. However, when the license file 133 is subsequently determined to be invalid during the re-validation process initiated by the schedule checker 119, the license manager module 103 may cease operations for the user operating under an invalid license file 133.

Embodiments of the license controller 113 may further comprise a policy updater 121. The policy updater 121 may perform the task or function of fulfilling requests to change or update a user's current basic policy 135 of the license file 133. Upon receiving a request to update the basic policy 135, the policy updater 121 may retrieve the basic policy 135 and total points 139 from the license file 133. The policy updater 121 may check the user's input for the policy update is correct to ensure that the basic policy 135, total points 139 and real-time points are accurate. If the input provided to the policy updater 121 is correct, the license controller 113 may perform a system call to the repository manager 123 to update the user policy 125. Conversely if the input of the user is incorrect, the policy updater 121 may return an error message to the user and display said error message on a display device of the client device 150.

For example, a basic policy 135 may have 10,000 total points 139 as defined in the license file 133. The basic policy 135 may define that one virtual machine consumes 10 points. Currently the client may have 500 virtual machines (3000 points). If the user's request is for 3000 virtual machines, the amount of resources requested (3000 VMs) would cost a total of 30,000 points, which exceeds the total points (10,000) for the basic policy 135 that the user has a license for. Thus, an error will be returned to the user's client device 150.

Embodiments of the policy updater 121 may further be responsible for requesting changes in the total resources defined by the licenses of the system 100, 200. A user may change the user's current basic policy 135 to allow for an increase or decrease in the total available computing resources that may be acquired and/or the total points 139 that may be allocated to the basic policy 135. FIG. 3 shows an example of a license file 133 comprising a basic policy 135, a transformation rule 13, total points 139, and common parameters 141 collected/stored by the license file 133. As shown by the license file 133 in the example, the license is currently limited to 10,000 total points 139 and a basic policy 135 that limits the maximum number of hosts to 1000 and 10,000 VMs. A user may request to update the current policy (for instance by upgrading the basic policy by paying more money to the service provider) and increase the total points 139, the max number of hosts and the max number of VMs. The policy updater 121 of the license controller may authorize and instruct the repository manager to update the data of the license file to include a new amount of total points 139 and updated basic policy 135, consistent with the increased or decreased policy acquired by the user.

Embodiments of the repository manager 123 may be responsible for retrieving and modifying and storing information found in license files 133 at the request of the license controller 113, which may be stored in one or more repositories of the system 100, 200. For example the license file may be stored in a local repository such as a local data storage device 108, as shown in FIG. 1 or a network accessible repository such as the network repository 167. The repository manager 123 may amend the parameters of the basic policy 135 via the user policy 125 service track the utilization of the points-based currency using the real-time points 127 service.

Figure 4:
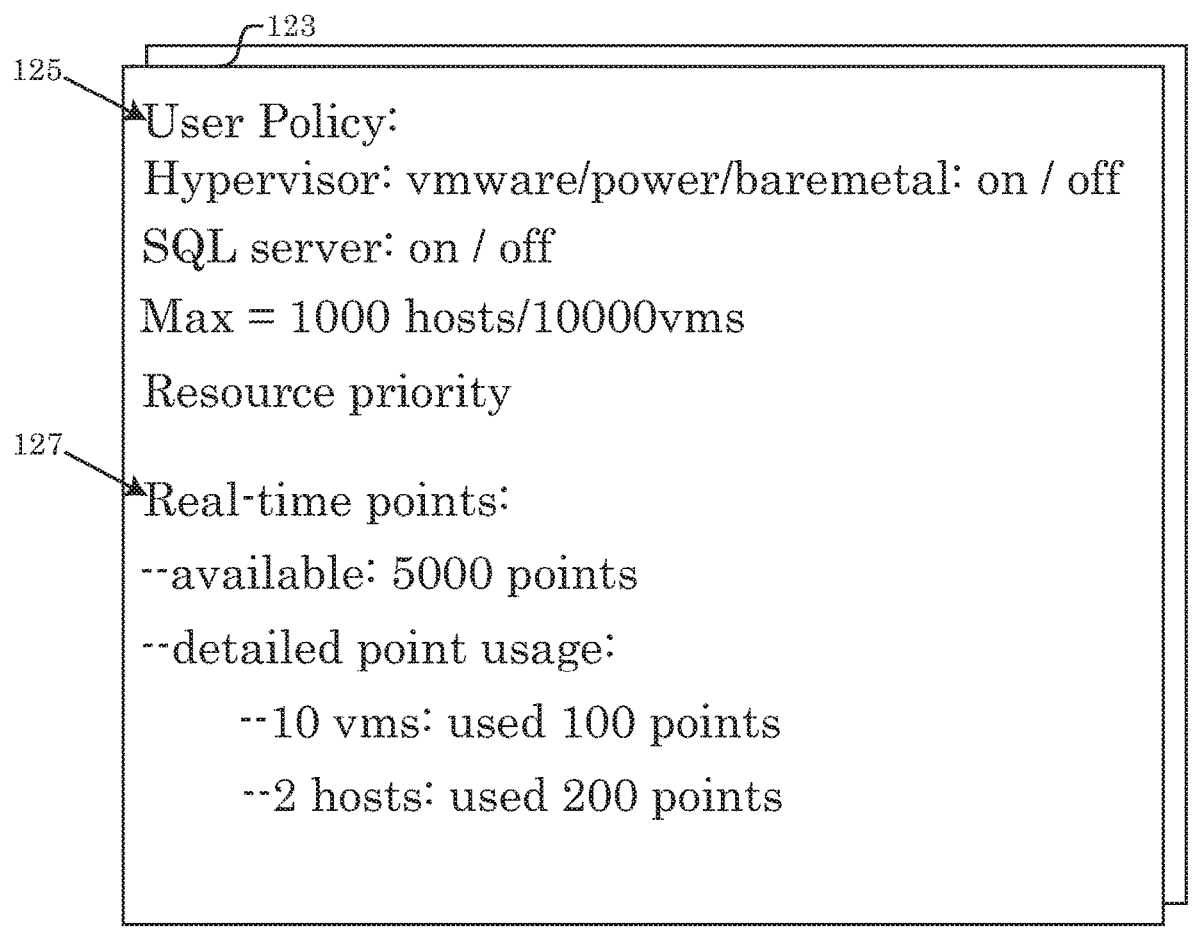
FIG. 4 depicts an embodiment of an entry into a database managed by a repository manager.

FIG. 4 depicts an example of an embodiment of records managed by the repository manager 123. As shown in the example, the repository manager may track entries in the user policy 125 and real-time points 127. The user policy 125 of the repository manager 123 may include the type information about the types of resources available to the user in accordance with the basic policy 135. For example, in the entry in the repository manager shown in FIG. 4, the user policy describes the hypervisor being used to run one or more virtual machines associated with the user's license, enabled database management services (i.e. SQL server or other database management systems), and the maximum number of hosts or virtual machines allowed per the user policy 125. The repository manager 123 may also display and log the use of the license's points via the real-time points 127 service. The real-time points 127 service may track and amend the total available points. For example, by subtracting points used to provision new resources or by adding back points for de-provisioning resources no longer needed or desired by the user. Moreover, in some embodiments, the records edited by the repository manager 123 may contain a log tracking the use for points for each resource request including the type of resource provisioned or de-provisioned as well as the amount of points used (during provisioning) or returned (de-provisioning) as a result of fulfilling the resource request.

Embodiments of the license manager module 103 may comprise in some embodiments a license transformer 130. Embodiments of the license transformer 130 may convert the point-based currency used for obtaining resources into the computing resources provided to the users as a function of the conversion of the points. The license transformer 130 converts the points using the point transformation 131 service, into the appropriately requested computing resources in accordance with the transformation rule 129 applied to the transformation as a function of the transformation rules 137 described by the license file 133. The license transformer 130 may return the results of the transformation of points to computing resources to the point validator 109.

In some embodiments of the systems 100, 200 the licensing management system 101 may be equipped with a management platform 104 (abbreviated as "Mgmt Platform 104" in FIG. 1) loaded into the memory device 114 of the licensing management system 101. Embodiments of the management platform may function as an operating system supporting each of the tasks and functions of the licensing management system 101, including the operations of the license manager module 103 as well as the abstraction layers 60, 70, 80, 90 of a cloud computing environment 50 in some embodiments. The management platform 104 may allow two or more users connecting to the licensing management system 101 via network 120 to run a plurality of separate instances of the license manager module 103 concurrently to multiple client devices 150. Embodiments of the management platform 104 may control physical and virtual resources users of the client devices are requesting. Embodiments of the management platform 104 may be executing the function of provisioning and de-provisioning the computing resources in accordance to the instructions of the license manager module 103 and more specifically, the license controller 113.

In some embodiments of the system 100, 200 the management platform 104 may further comprise an auto detector 106. The auto detector 106 may perform the function or task of monitoring the computing environment of the system 100, 200 and the resources being consumed by the licensed users accessing the licensing management system 101. Embodiments of the auto detector 106 may apply for additional computing resources on behalf of licensed users of the system 100, 200 as a function of changes in the computing environment when the additional resources are within the scope of the basic policy 135 of the license and a sufficient amount of total points 139 are available. For example, the auto-detector may detect a significant increase in the number of client devices 150 or VMs authorized to access the services of a cloud computing environment under a particular license. The significant increase may be overwhelming for the number of hosts currently enabled under the license. The auto detector 106 may place a resource request to the license manager module 103 to convert a certain amount of available points authorized under the license to obtain access to additional hosts for the increased number of client devices 150 and VMs connecting to the cloud provided services.

In some embodiments, the auto detector 106 may reactively provision and de-provision these resources as the demand for resources changes. Using the example with the rapid provisioning of additional hosts in respond to the excessive demand by client devices 150, the auto detector also identify when the computing environment under a particular license is not being utilized as heavily. For instance, if the number of client devices 150 and VMs connecting to the cloud services subsides, the auto detector may submit a subsequent resource request to the license manager module 103 to de-provision one or more of the hosts in exchange for recouping a plurality of points in accordance with the transformation rules 137 of the license file 133.

Referring to FIGS. 1-2, embodiments of the system 100, 200 may include a license generator 160. As shown in the drawings, the license generator may be integrated into the licensing management system 101, the license manager module 103 or integrated into a separate computing system accessible via the network 120 by either the licensing management system 101 and/or one or more of the client devices 150 connected to the network 120. The license generator 160 may perform the function or task of creating new license files 133 at the request of one or more users, administrators or the licensing management system 101.

The creation of the license file 133 via the license generator may create the new license file 133 which may be customized in accordance with the level of resources requested. To achieve the creation of the license file 133, embodiments of the license generator 160 may include a basic policy generator 161 (abbreviated as "Basic Policy 161" in FIGS. 1-2), configuration generator 163 (abbreviated as "Configuration 163" in FIGS. 1-2) and a user data collection service 165 (abbreviated as "User Data 165" in FIGS. 1-2). Embodiments of the basic policy generator 161 may create the basic policy 135 of the license file 133 in accordance with the input of the user requesting the license file. For example, the requesting party of the new license file may pay for a particular level of service to a service provider operating under the point-based licensing system 100, 200 of the current application. A requesting party may select a particular package or service level based on the cost of obtaining a particular amount of total points 139 which may be spent on computing resources. Moreover, the requesting party of the new license may select the types of computing resources that may be enabled by the license. For example storage specific software applications, storage/cloud storage solutions, database access, a particular hypervisor partitioning up to a set number of VMs and hosts, a specified number MySQL instances, etc. Based on the requesting party's input, the basic policy generator 161 may create the requested license file 133 which includes the level of services, points and access to the types of resources selected.

Embodiments of the license generator 160 may further comprise a configuration generator 163. The configuration generator 163 may configure the total amount of points 139 that may be available to the users of the license file as a function of the basic policy selected during the creation of the basic policy generator 161 as well as transformation rules 137 defining the conversion of points to computing resources as shown by the example of FIG. 3. For instance, a basic policy 135 maybe generated for client devices 150 to access virtual machines using virtualization software VMware, may require resources such as the provisioning of one or more virtual machines, hosts to support the connections of client devices 150 utilizing the virtual machines of the VMware, access to applications capable of being run by the VMs, and the ability to transmit API calls between the virtual machines and the hosts. The configuration generator 163 may set the point costs associated with each of the resources needed for supporting and running the programs, applications and services on the network, in this example VMs running applications over VMware.

Moreover, the system 100, 200 may allow not only for flexible expansion of resources by allocating point values to each resource during the configuration of the license file, but the configuration generator 163 may also define the depreciation rate of resources as the resource is de-provisioned, allowing for points to be returned to the pool of total points 139 as tracked by the real-time points service 127 of the repository manager 123. Embodiments of the disclosed systems may set the depreciation value of de-provisioned resources to any value desired by the service provider. For example, the service provider may not depreciate the points at all, allowing for a one to one exchange of points for both provisioning and de-provisioning resources. In alternative embodiments, de-provisioned resources may return a fraction of the point cost spent when the resources were initially provisioned. For example, 95%, 90%, 80%, 75%. 50%, 30%, or 25%, etc. of the original point value may be received in return for de-provisioning computing resources. In the example embodiment shown in FIG. 3, the depreciation rate of 0.9 (or 90% rate of return) on points spent to provision a virtual machine will be recouped when the resource is de-provisioned). Under the example depreciation rate, a VM costing 10 points for each VM to be provisioned will yield back 9 points for each VM de-provisioned. Moreover, in some embodiments, a depreciation rate may differ based on the type of resource being provisioned and de-provisioned.

Method for Licensing Computing Resources

The drawings of FIGS. 7a-10 represents embodiments of algorithms 700, 750, 800, 900, 950, 1000 that may be implemented for licensing computing resources to customers using one or more computer systems 1100 defined generically in FIG. 11 below, and more specifically by the specific embodiments of one or more computer systems depicted in FIGS. 1-6. A person skilled in the art should recognize that the steps of the method described in FIGS. 7a-10 may not require all of the steps disclosed herein to be performed, nor do the algorithms 700, 750, 800, 900, 950, 1000 of FIGS. 7a-10 necessarily require that all the steps be performed in the particular order presented. Variations of the method steps presented in FIGS. 7a-10 may be performed in a different order than presented by FIGS. 7a-10.

Figure 7A:
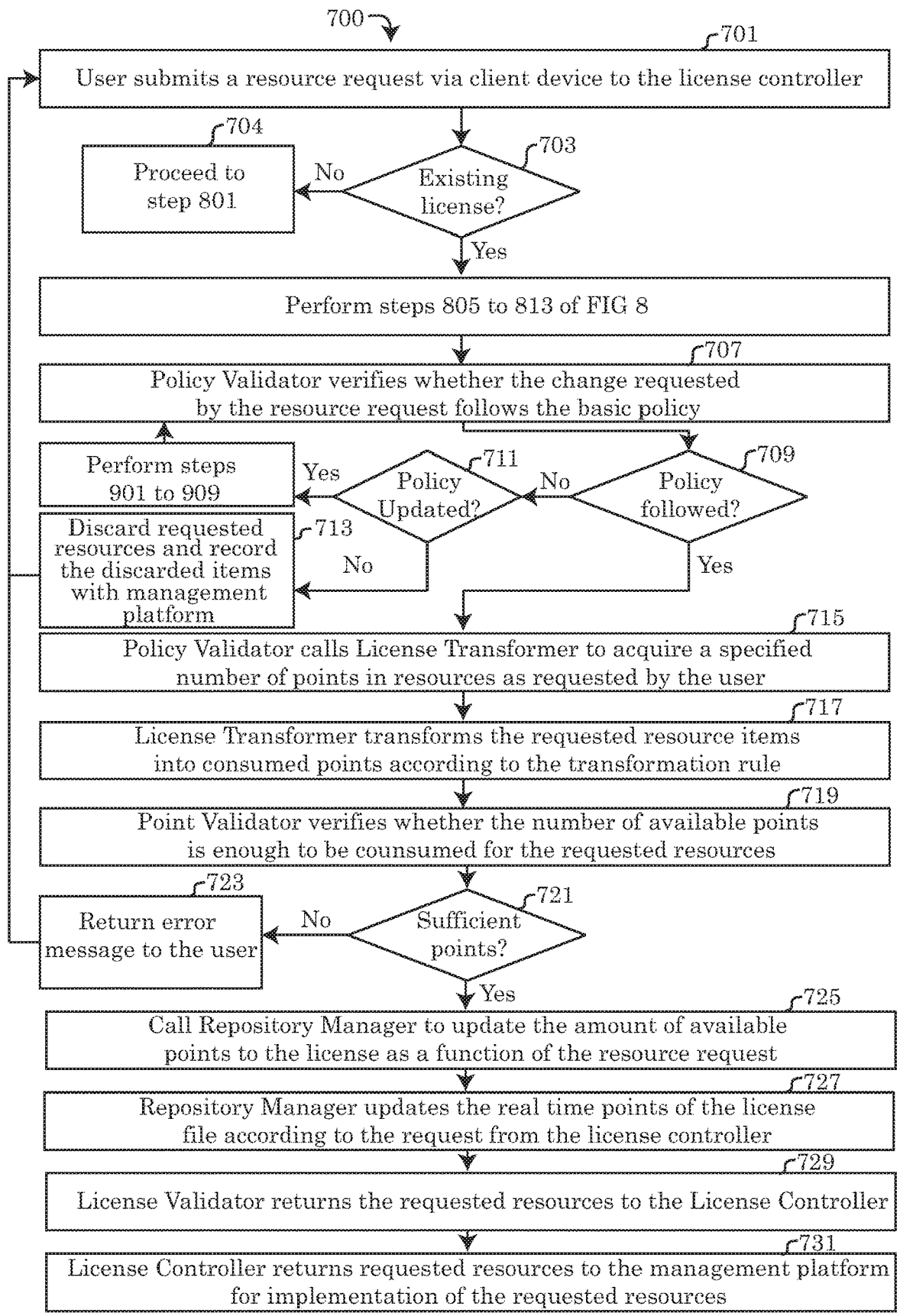
FIG. 7a depicts a flow chart describing an embodiment of an algorithm for licensing computing resources to customers consistent with the systems, devices and tools described throughout the present disclosure.

The algorithm 700 described in FIG. 7a may describe an embodiment for licensing computing resources. The algorithm 700 may initiate in step 701 by a user connected to a network 120 via a client device 150 transmitting a resource request to a license controller 113 of the license management system 101. Upon receipt of the resource request from the client device 150, the license controller 113 may make a determination in step 703, wherein the license initialization 115 of the license controller 113 identifies the resource request as being directed toward an existing license file 133 or a new license file. If, in step 703, the resource request is directed toward an existing license file 133, the algorithm 700 may proceed to step 705. Otherwise, if the resource request is not directed toward an existing license file 133, a new license file 133 may need to be created first. When a new license file 133 should be created first, before proceeding with algorithm 700, the algorithm 700 may proceed to step 801 and initiate a new license creation algorithm 800.

Under the new license creation algorithm 800, the resource request transmitted by the client device 150 in step 701 may be directed toward new license file. In step 801 the license initialization 115 of the license controller 113 affirms that the resource request identifies is directed toward a new license file that should be created in accordance with the input provided to the licensing management system 101 from the client device 150. Subsequently, in step 803, as a function of the input from the client device 150, the license generator 160 generates a new license file. Embodiments of the new license file 133 may be generated to include a basic policy 135, transformation rules 137, an amount of total points 139 and one or more parameters 141 identifying the authorized users and/or client devices capable of accessing the license file. For example, by IP addresses and MAC addresses. Moreover, the newly formed license file 133 may include an expiration date or a date describing a length of time the license file 133 is valid until. The newly generated license file may be saved to a computer readable storage device, for example a storage location that may be local to the licensing management system 101 (i.e. local data storage device 108) or a storage device accessible via the network 120, such as network repository 167.

In step 805 of algorithm 800, the license controller 113 may make a system call to the license initialization 115 service to load the license file 133 generated in step 803 into the memory device 114 of the licensing management system 101. Once loaded, the license validation 117 of the license controller 113 may, in step 807 evaluate the validity of the license file 807 to ensure that the license was properly obtained and has not expired. A determination is made in step 809 whether or not the license file 133 is valid. If license validation 117 identifies that the license file 133 is invalid, the algorithm 809 may proceed to step 811 wherein the license manager module 103 will fail to start and/or cease functioning. Conversely, if the license file 133 is verified as being valid by license validation 117, the algorithm 800 may proceed to step 813 wherein the license manager module 103 may be loaded using the license file 133 that was validated in step 807.

Upon validation of the new license file in step 809, the algorithm 800 may proceed to back to step 707 of algorithm 700 or 750 (described below) in some embodiments. Moreover, upon loading the license file 133 into the license manager module 103, the system 100, 200 may periodically call the license validation 117 to re-evaluate the validity of the license 133, similar to step 807 and 807 of algorithm 800. The schedule checker 119 may call license validation 117 to perform the validation of license files at regularly schedule intervals or randomly. If at any time a validation of a license file 133 fails to be identified as valid, the license controller 113 may cease operations of the license manager module 103 for the client devices 150 attempting to access the licensing management system 101 using an invalid license.

Figure 8:
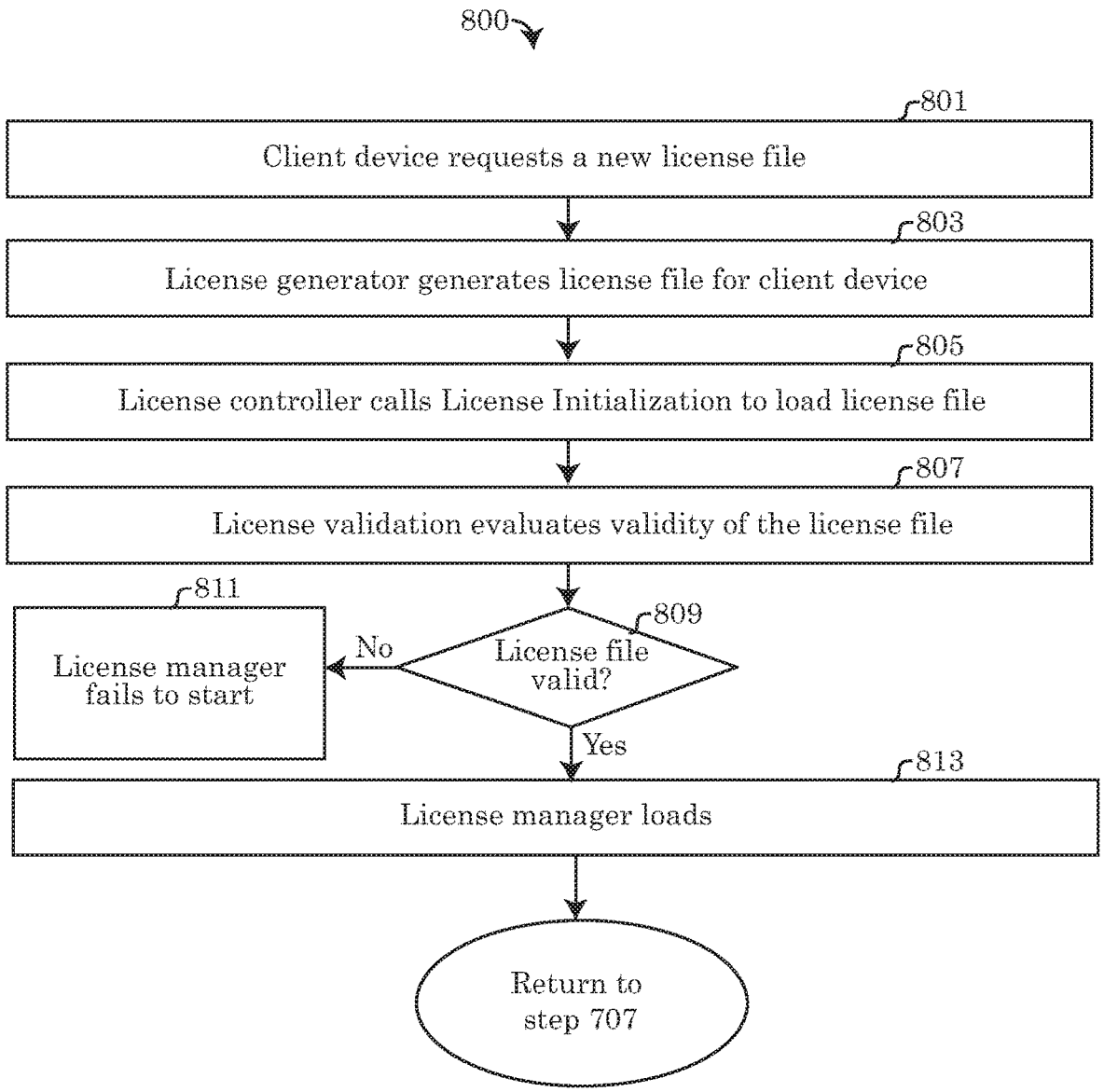
FIG. 8 depicts an embodiment of algorithm for generating and periodically authenticating a new license file.

Referring back to step 703 of algorithm 700, which is determining whether or not a license file 133 currently exists, if the a determination is made that the resource request of step 701 is directed toward an existing license file 133, the algorithm 700 may proceed to step 805 of FIG. 8 and subsequently perform steps 805 to 813 as described above for loading and validating the license file 133.

Upon completion of step 813, the algorithm 700 may proceed, in step 707 to verify, via the policy validator 111, the current level of computing resources as defined by the resource request in step 701 an whether the resource request is properly within the scope of the basic policy 135 of the license file 133 and proceed to step 709. If the resource request is considered to follow the scope of the basic policy 135, the algorithm 700 may proceed to step 715. Otherwise, the algorithm may proceed to step 711 for further consideration whether or not a policy update has been requested or performed. An update to the basic policy 135 may alter the scope of the basic policy 135 in a manner that may place the resource request of step 701 into compliance with the scope of the updated basic policy.

If, in step 711 a determination is made by the policy updater 121 of the license controller 131 that a policy update has not been requested, the algorithm 700 may proceed to step 713, wherein the resource request of step 701 may be discarded and the discarded request for resources may be recorded or logged with the management platform 104 of the licensing management system 101. Alternatively, if in step 711 a policy update has been requested, the algorithm 700 may proceed to step 901 of the policy update algorithm 900 in order to complete the update to the basic policy 135 before re-verifying with the policy validator 111 that the scope of the resource request is within the scope of the basic policy in step 707.

Figure 9A:
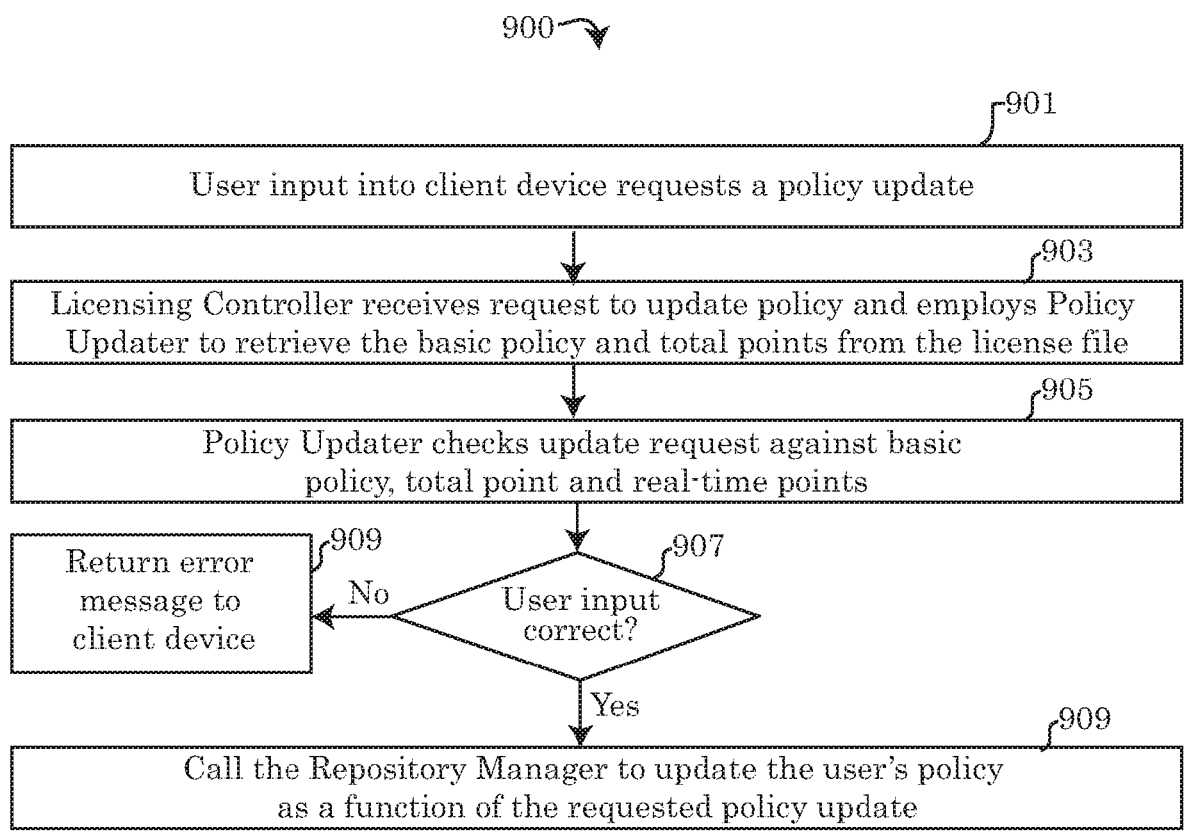
FIG. 9a depicts an embodiment of an algorithm for generating a policy update as a function of a user's input requesting a policy update.
Figure 9B:
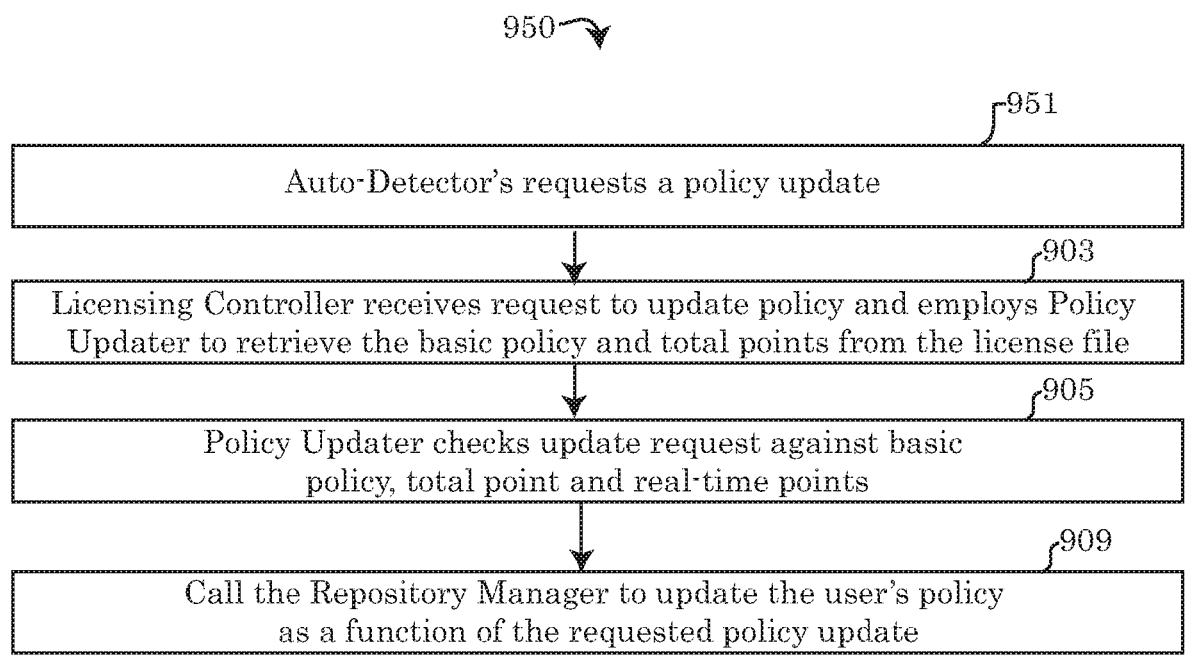
FIG. 9b depicts an alternative embodiment of an algorithm for generating a policy update as a function of an auto detector's input requesting a policy update.
Figure 10:
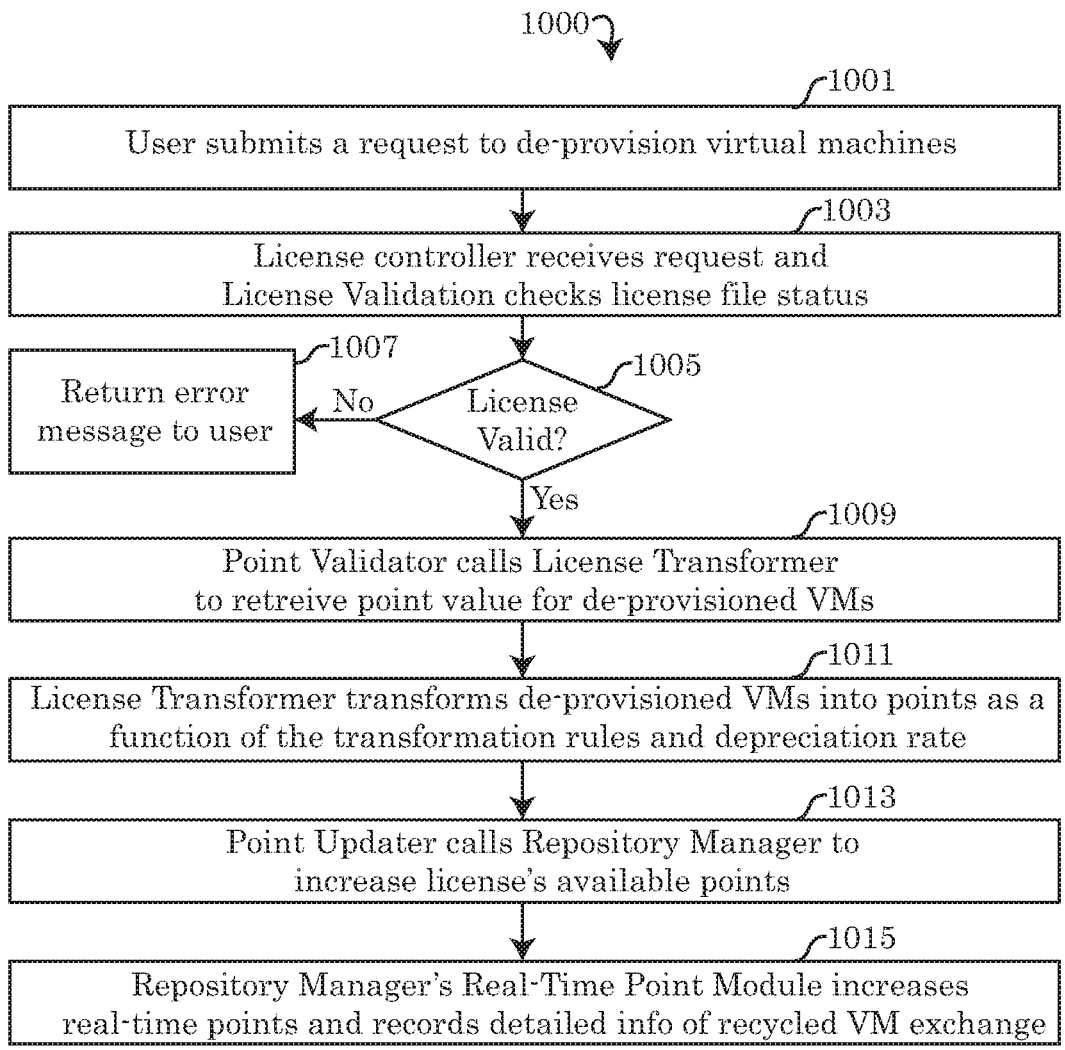
FIG. 10 depicts an embodiment of an algorithm for de-provisioning and recycling licensed resources.

FIG. 9a describes an embodiment of algorithm 900 which may be used for performing updates to the basic policy 135 of the license file 133 as requested by a user. Beginning in step 901 of the algorithm, user input into a client device 150 has submitted a request to the licensing management system 101 to update the basic policy 135 of the license file. In step 903, the licensing controller 113 receives the request to update the basic policy 135 and employs the policy updater 121 to retrieve basic policy 135 data and the total points 139 data from the license file 133.

In step 905, the policy updater checks the update request received in step 903 against the parameters defining the basic policy 135, the total points 139 and the real-time points 127 being tracked by the repository manager 123. For example, the request may be directed toward changing the types of computing resources available, increasing the total points 139, increasing the maximum amounts of resources that may be obtained, changing service terms, for instance changing the basic policy 135 to a different policy that may have different transformation rules 137, etc. In step 907 of the algorithm 900, the policy updater makes a determination whether or not the user's input of the request is proper/error free. If, the user's input is not proper, the algorithm may proceed to step 909 and return an error message back to the client device 150, indicating to the user the errors in the request and may allow for the user to correct the errors and/or resubmit the policy update request.

Conversely, if the user input is determined to be correct in step 907, the algorithm 900 may proceed to step 909, wherein license controller with perform a system call to the repository manager 123. As a function of the system call, the repository manager 123 may update the basic policy 135, including writing the changes resulting from the policy update to the license file 133. Once the policy update has been completed, if the policy update request was made in conjunction with a separate resource request, the repository manager may call the policy validator to re-perform the validation step 707-709 as described above and continue performing algorithm 700. Otherwise, if no additional resource request had been made, the algorithm 900 may conclude.

Referring back to step 709 of algorithm 700, if a determination is made in step 709 by policy verifier 109 that the resource request follows the parameters of the basic policy 135, the algorithm may continue onto step 715, wherein the policy validator may perform a system call to the license transformer 130 to transform a specified number of points into a particular set of computing resources as requested by the user in step 701. In step 717, the license transformer 130 performs the requested transformation of the system call made in step 715. The license transformer transforms the requested resource item (i.e. a particular amount of points) into a consumed amount of points in accordance with the transformation rules 137 of the license file 133.

Subsequently, in step 719, the point validator 109 verifies whether the number of available points is sufficient to be consumed for the requested resources. If, it is determined in step 721 that there is an insufficient amount of available points to provision the requested amount of computing resources, the algorithm 700 may proceed to step 723, which may return an error message to the user's client device 150 informing the user that there is an insufficient amount of available points to complete the resource request. Alternatively, if in step 721 there is a determination that the amount of available points are sufficient to fulfill the resource request, the algorithm proceeds to step 725.

In step 725 of the algorithm, the license controller performs a system call to the repository manager 123, instructing the repository manager to update the amount of available points of the license file in accordance with the amount of points that were consumed by the transformation performed by the license transformer in step 717. In step 727, the repository manager 123 updates the real-time points 127 of the license file 133 as a function of the system call received from the license controller in step 725. Upon the update of the real-time points 127 by the repository manager 123, the algorithm 700 may proceed to step 729, wherein the license validator 105 returns the requested resources to the license controller 113 and in step 731, the license controller returns the requested resources to the management platform 104 which implements the provisioning of the requested resources to the proper licenses.

Figure 7B:
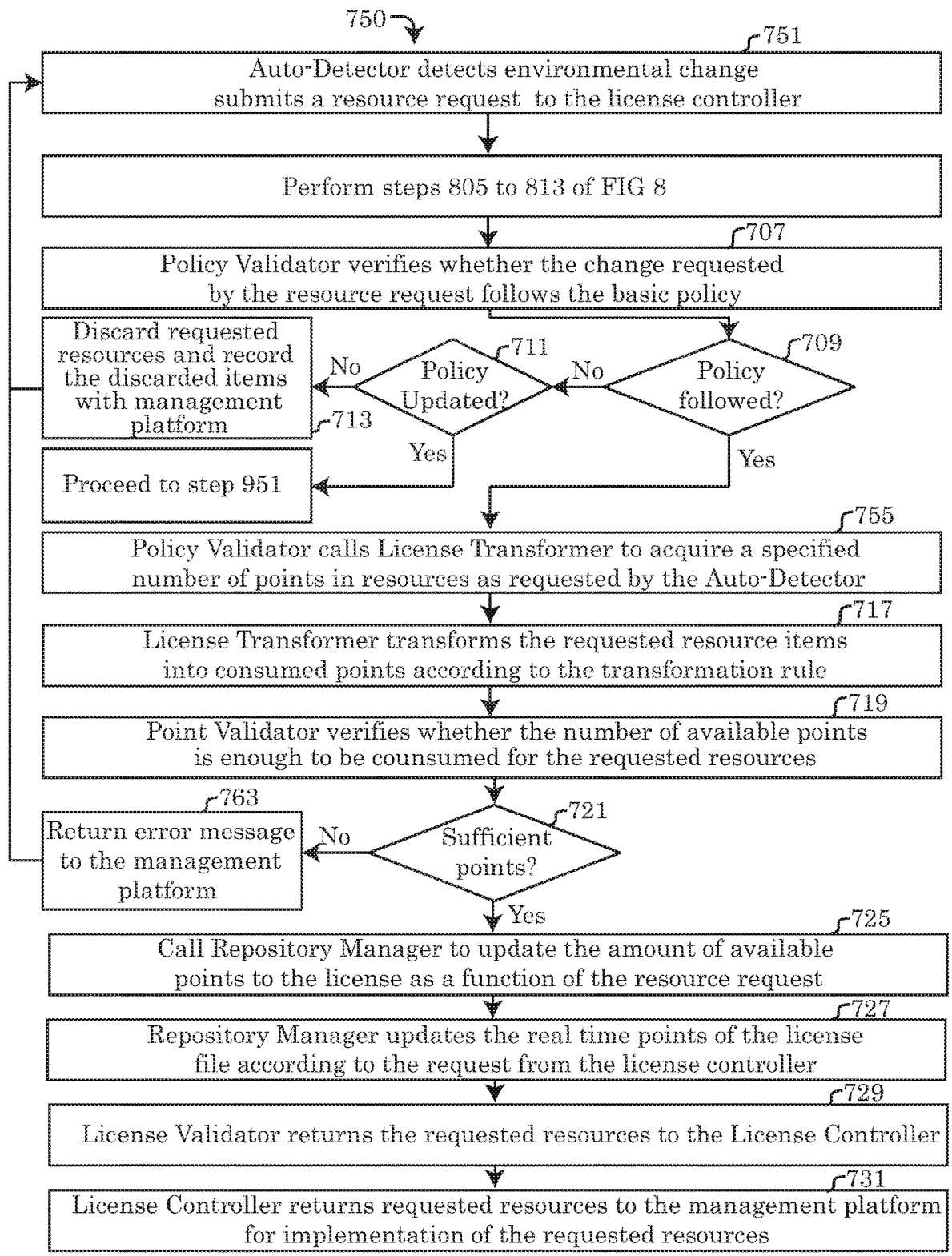
FIG. 7b depicts a flow chart describing an alternative embodiment of an algorithm for licensing computing resources to customers consistent with the systems, devices and tools described throughout the present disclosure.

Algorithm 750 of FIG. 7b is an alternative algorithm to the algorithm of FIG. 7a. The difference between algorithm 750 and 700 stems from the origination of the resource request. For example, algorithm 750 begins at step 751, wherein instead of a user making the resource request, an auto-detector 106 of the management platform 104 detects an environmental change in a computing environment which prompts the submission of the resource request to the license controller 113.

Steps 705-707 proceed as previously described in algorithm 700 above. Step 709 comprises a slight variation with respect to the determination whether or not the basic policy 135 is followed. If the resource request in step 751 is within the scope of the basic policy 135, the algorithm 750 proceeds to step 755, wherein the policy validator calls the license transformer to acquire a specified number of points in resources as requested by the auto-detector 104 (as opposed to the user).

Conversely, if the policy is not followed by the resource request, a determination is made in step 711 whether or not a policy update has been requested. If no policy update has been requested, the algorithm 750 proceeds to step 713 as described above. However, if a policy update has been requested, the algorithm proceeds to step 950 which is an alternative embodiments of the policy update algorithm 900, wherein the algorithm 950 begins at step 951 whereby the auto-detector 104 requests the policy update, as opposed to the user requesting the policy update as described in step 901 of algorithm 900.

Resuming from step 755, algorithm 750 continues to proceed to steps 717 to 731 as described during the algorithm 700. The only remaining difference comes in step 721, wherein the point validator determines that there are insufficient points to proceed with transforming the points into the requested resources. Rather than proceeding to step 723, algorithm 750 proceeds to step 763, wherein the error message for the insufficient points is returned to the management platform 104 instead of the client device 150 being utilized by the user, since the auto-detector 106 of the management platform is the originator of the resource request in algorithm 750.

Computer System

Figure 11:
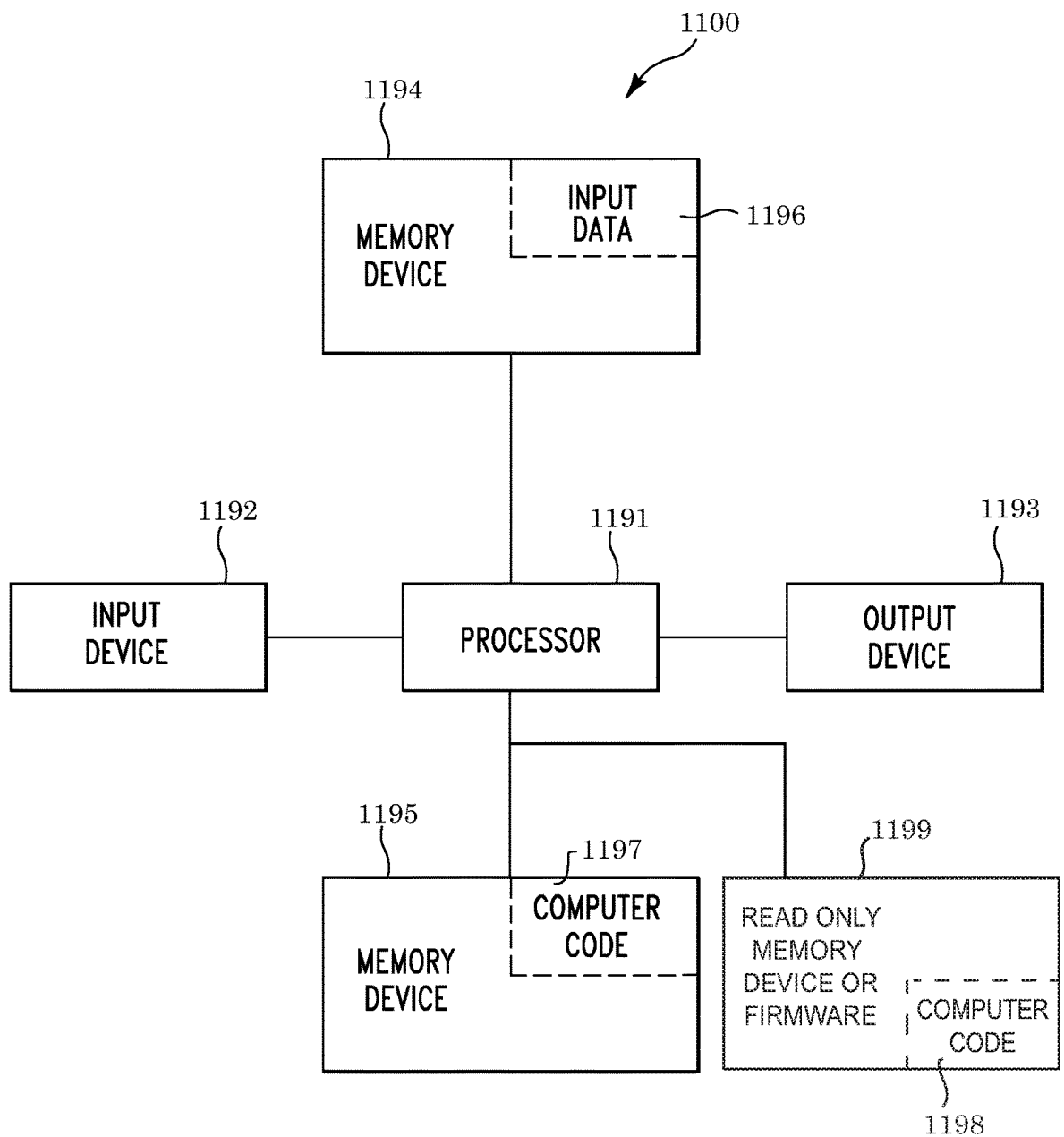
FIG. 11 depicts a block diagram of a computer system able to implement the methods for licensing computing resources consistent with the disclosure of the present application.

Referring to the drawings, FIG. 11 illustrates a block diagram of a computer system 1100 that may be included in the systems of FIGS. 1-6 and for licensing computing resources to customers as described in FIGS. 7a-10 and in accordance with the embodiments described in the present disclosure. The computer system 1100 may generally comprise a processor 1191, otherwise referred to as a central processing unit (CPU), an input device 1192 coupled to the processor 1191, an output device 1193 coupled to the processor 1191, and memory devices 1194 and 1195 each coupled to the processor 1191. The input device 1192, output device 1193 and memory devices 1194, 1195 may each be coupled to the processor 1191 via a bus. Processor 1191 may perform computations and control the functions of computer 1100, including executing instructions included in the computer code 1197 for tools and programs for licensing computing resources to customers, in the manner prescribed by the embodiments of the disclosure using the systems of FIGS. 1-6, wherein the instructions of the computer code 1197 may be executed by processor 1191 via memory device 1195. The computer code 1197 may include software or program instructions that may implement one or more algorithms for implementing the methods for licensing computing resources to customers, as described in detail above. The processor 1191 executes the computer code 1197. Processor 1191 may include a single processing unit, or may be distributed across one or more processing units in one or more locations (e.g., on a client and server).

The memory device 1194 may include input data 1196. The input data 1196 includes any inputs required by the computer code 1197, 1198. The output device 1193 displays output from the computer code 1197, 1198. Either or both memory devices 1194 and 1195 may be used as a computer usable storage medium (or program storage device) having a computer readable program embodied therein and/or having other data stored therein, wherein the computer readable program comprises the computer code 1197, 1198. Generally, a computer program product (or, alternatively, an article of manufacture) of the computer system 1100 may comprise said computer usable storage medium (or said program storage device).

Memory devices 1194, 1195 include any known computer readable storage medium, including those described in detail throughout this application. In one embodiment, cache memory elements of memory devices 1194, 1195 may provide temporary storage of at least some program code (e.g., computer code 1197, 1198) to reduce the number of times code must be retrieved from bulk storage while instructions of the computer code 1197, 1198 are executed. Moreover, similar to processor 1191, memory devices 1194, 1195 may reside at a single physical location, including one or more types of data storage, or be distributed across a plurality of physical systems in various forms. Memory devices 1194, 1195 can include data distributed across, for example, a local area network (LAN) or a wide area network (WAN). Further, memory devices 1194, 1195 may include an operating system (not shown) and may include other systems not shown in the figures.

In some embodiments, rather than being stored and accessed from a hard drive, optical disc or other writeable, rewriteable, or removable hardware memory device 1194, 1195, stored computer program code 1198 (e.g., including algorithms) may be stored on a static, non-removable, read-only storage medium such as a Read-Only Memory (ROM) device 1199, or may be accessed by processor 1191 directly from such a static, non-removable, read-only medium 1199. Similarly, in some embodiments, stored computer program code 1197 may be stored as computer-readable firmware 1199, or may be accessed by processor 1191 directly from such firmware 1199, rather than from a more dynamic or removable hardware data-storage device 1195, such as a hard drive or optical disc.

In some embodiments, the computer system 1100 may further be coupled to an Input/output (I/O) interface 110 and a computer data storage unit (for example a data store, data mart, network repository 167 or local data storage device 108). An I/O interface 110 may include any system for exchanging information to or from an input device 1192 or output device 1193. The input device 1192 may be, inter alia, a keyboard, joystick, trackball, touchpad, mouse, sensors, beacons, RFID tags, microphones, biometric input device, camera system, timer, etc. The output device 1193 may be, inter alia, a printer, a plotter, a display device (such as a computer screen or monitor), a magnetic tape, a removable hard disk, a floppy disk, etc. The memory devices 1194 and 1195 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 1100, and may include any type of transmission link, including electrical, optical, wireless, etc.

The I/O interface 110 may allow computer system 1100 to store information (e.g., data or program instructions such as program code 1197, 1198) on and retrieve the information from a computer data storage unit (such as the local data storage device 108). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect licensing computing resources to customers. Thus, an embodiment of the present invention discloses a process for supporting computer infrastructure, where the process includes providing at least one support service for at least one of integrating, hosting, maintaining and deploying computer-readable code (e.g., program code 1197, 1198) in a computer system (e.g., computer 1100) including one or more processor(s) 1191, wherein the processor(s) carry out instructions contained in the computer code 1197 causing the computer system to license computing resources to customers. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for licensing computing resources to customers as described in this application. Thus the present invention discloses a process for supporting, deploying and/or integrating computer infrastructure, integrating, hosting, maintaining, and deploying computer-readable code into the computer system 1100, wherein the code in combination with the computer system 1100 is capable of performing a method of licensing computing resources to customers.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for licensing computing resources to customers, said method comprising:
  receiving, by a processor, a resource request associated with a license file storing data relating to an existing license for obtaining computing resources from a license management system, wherein the resource request is a request to provision computing resources obtainable through the license to the customers associated with the license file, wherein the license file comprises an amount of available point-based currency that is exchangeable for the computing resources obtainable through the license, types of resources obtainable through the license, maximum amounts of the resources obtainable through the license, an expiration date describing how long the license file is valid for accessing the computing resources, and Internet Protocol (IP) and/or Media Access Control (MAC) addresses of computing systems and client devices capable of accessing the computing resources;
  validating, by the processor, the license file;
  verifying, by the processor, that the resource request follows a basic policy of the license file and the amount of available point-based currency of the license file is greater than or equal to an amount of point-based currency sufficient for exchanging the computing resources requested by the resource request;
  transforming, by the processor, the amount of available point-based currency into an amount of consumed point-based currency in exchange for each requested resource as a function of a transformation rule in the license file;
  provisioning, by the processor, the computing resources to the customers associated with the license file;
  updating, by the processor, the amount of available point-based currency in real-time as a function of said transforming; and
  automatically detecting, by the processor, (i) an increase in a number of virtual machines (VMs) authorized to access services of a cloud computing environment under the license and in response, obtaining, by the processor, access to additional hosts for the increased number of VMs connecting to the cloud provided services in exchange for converting, by the processor, an amount of available points authorized under the license to obtain the access to the additional hosts or (ii) a decrease in the number of VMs authorized to access the services of the cloud computing environment under the license and in response, de-provisioning, by the processor, one or more hosts in exchange for recouping a plurality of points in accordance with the transformation rule.

2. The method of claim 1, said method further comprising:
  receiving, by the processor, a request to generate a new license file;
  transmitting, by the processor, the request to generate the new license file to a license generator; and
  generating, the new license file comprising the transformation rule and the amount of available point-based currency as a function of a basic policy selected by a user.

3. The method of claim 1, wherein the resource request is created via an auto-detector detecting a change in a computing environment necessitating additional computing resources.

4. The method of claim 1, said method further comprising:
  receiving, by the processor, a request to de-provision computing resources;
  retrieving, by the processor, a point value for the de-provisioned computing resources as a function of the transformation rules of the license file;
  transforming, by the processor, the de-provisioned computing resources into the point value as a function of a depreciation rate defined by the transformation rule in the license file; and
  increasing, by the processor, the amount of available point-based currency in the license file, by the point value obtained from the transformation of the de-provisioned computing resources.

5. The method of claim 1, said method further comprising:
  receiving, by the processor, a request to update the basic policy of the license file;
  retrieving, by the processor, the basic policy and total amount of point-based currency from the license file;
  verifying, by the processor, the request to update the basic policy of the license file comprises a correct input from a requesting user; and
  updating, by the processor, the basic policy as a function of the request to update the basic policy of the license file, increasing or decreasing the total amount of point-based currency available to the license file.

6. The method of claim 1, said method further comprising providing at least one support service for at least one of creating, integrating, hosting, maintaining, and deploying computer-readable program code in a computer system, where the computer-readable program code in combination with the computer system is configured to implement said receiving, validating, verifying, transforming, provisioning and updating.

7. A computer system, comprising:
  a processor, a memory device coupled to the processor; and a computer readable storage device coupled to the processor, wherein the storage device contains program code executable by the processor via the memory device to implement a method for licensing computing resources to customers, said method comprising:
  receiving, by the processor, a resource request associated with a license file storing data relating to an existing license for obtaining computing resources from a license management system, wherein the resource request is a request to provision computing resources obtainable through the license to the customers associated with the license file, wherein the license file comprises an amount of available point-based currency that is exchangeable for the computing resources obtainable through the license, types of resources obtainable through the license, maximum amounts of the resources obtainable through the license, an expiration date describing how long the license file is valid for accessing the computing resources, and Internet Protocol (IP) and/or Media Access Control (MAC) addresses of computing systems and client devices capable of accessing the computing resources;
  validating, by the processor, the license file;
  verifying, by the processor, that the resource request follows a basic policy of the license file and the amount of available point-based currency of the license file is greater than or equal to an amount of point-based currency sufficient for exchanging the computing resources requested by the resource request;
  transforming, by the processor, the amount of available point-based currency into an amount of consumed point-based currency in exchange for each requested resource as a function of a transformation rule in the license file;
provisioning, by the processor, the computing resources to the customers associated with the license file;
updating, by the processor, the amount of available point-based currency in real-time as a function of said transforming; and
automatically detecting, by the processor, (i) an increase in a number of virtual machines (VMs) authorized to access services of a cloud computing environment under the license and in response, obtaining, by the processor, access to additional hosts for the increased number of VMs connecting to the cloud provided services in exchange for converting, by the processor, an amount of available points authorized under the license to obtain the access to the additional hosts or (ii) a decrease in the number of VMs authorized to access the services of the cloud computing environment under the license and in response, de-provisioning, by the processor, one or more hosts in exchange for recouping a plurality of points in accordance with the transformation rule.

8. The computer system of claim 7, said method further comprising:
receiving, by the processor, a request to generate a new license file;
transmitting, by the processor, the request to generate the new license file to a license generator; and
generating, the new license file comprising the transformation rule and the amount of available point-based currency as a function of a basic policy selected by a user.

9. The computer system of claim 7, wherein the resource request is created via an auto-detector of the computer system detecting a change in a computing environment necessitating additional computing resources.

10. The computer system of claim 9, said method further comprising:
receiving, by the processor, a request to de-provision computing resources;
retrieving, by the processor, a point value for the de-provisioned computing resources as a function of the transformation rules of the license file;
transforming, by the processor, the de-provisioned computing resources into the point value as a function of a depreciation rate defined by the transformation rule in the license file; and
increasing, by the processor, the amount of available point-based currency in the license file by the point value obtained from the transformation of the de-provisioned computing resources.

11. The computer system of claim 9,
receiving, by the processor, a request to update the basic policy of the license file;
retrieving, by the processor, the basic policy and total amount of point-based currency from the license file;
verifying, by the processor, the request to update the basic policy of the license file comprises a correct input from a requesting user; and
updating, by the processor, the basic policy as a function of the request to update the basic policy of the license file, increasing or decreasing the total amount of point-based currency available to the license file.

12. A computer program product comprising: one or more computer readable hardware storage devices having computer readable program code stored therein, said program code containing instructions executable by a processor to implement a method for licensing computing resources to customers, said method comprising:
receiving, by the processor, a resource request associated with a license file storing data relating to an existing license for obtaining computing resources from a license management system, wherein the resource request is a request to provision computing resources obtainable through the license to the customers associated with the license file, wherein the license file comprises an amount of available point-based currency that is exchangeable for the computing resources obtainable through the license, types of resources obtainable through the license, maximum amounts of the resources obtainable through the license, an expiration date describing how long the license file is valid for accessing the computing resources, and Internet Protocol (IP) and/or Media Access Control (MAC) addresses of computing systems and client devices capable of accessing the computing resources;
verifying, by the processor, that the resource request follows a basic policy of the license file and the amount of available point-based currency of the license file is greater than or equal to an amount of point-based currency sufficient for exchanging the computing resources requested by the resource request;
transforming, by the processor, the amount of available point-based currency into an amount of consumed point-based currency in exchange for each requested resource as a function of a transformation rule in the license file;
provisioning, by the processor, the computing resources to the customers associated with the license file;
updating, by the processor, the amount of available point-based currency in real-time as a function of said transforming; and
automatically detecting, by the processor, (i) an increase in a number of virtual machines (VMs) authorized to access services of a cloud computing environment under the license and in response, obtaining, by the processor, access to additional hosts for the increased number of VMs connecting to the cloud provided services in exchange for converting, by the processor, an amount of available points authorized under the license to obtain the access to the additional hosts or (ii) a decrease in the number of VMs authorized to access the services of the cloud computing environment under the license and in response, de-provisioning, by the processor, one or more hosts in exchange for recouping a plurality of points in accordance with the transformation rule.

13. The computer program product of claim 12, said method further comprising:
receiving, by the processor, a request to generate a new license file;
transmitting, by the processor, the request to generate the new license file to a license generator; and
generating, the new license file comprising the transformation rule and the amount of available point-based currency as a function of a basic policy selected by a user.

14. The computer program product of claim 12, wherein the resource request is created via an auto-detector of the computer system detecting a change in a computing environment necessitating additional computing resources.

15. The computer program product of claim 12, said method further comprising:

receiving, by the processor, a request to de-provision computing resources;

retrieving, by the processor, a point value for the de-provisioned computing resources as a function of the transformation rules of the license file;

transforming, by the processor, the de-provisioned computing resources into the point value as a function of a depreciation rate defined by the transformation rule in the license file; and increasing, by the processor, the amount of available point-based currency in the license file, by the point value obtained from the transformation of the de-provisioned computing resources.

16. The computer program product of claim 12, said method further comprising:

receiving, by the processor, a request to update the basic policy of the license file;

retrieving, by the processor, the basic policy and total amount of point-based currency from the license file;

verifying, by the processor, the request to update the basic policy of the license file comprises a correct input from a requesting user; and updating, by the processor, the basic policy as a function of the request to update the basic policy of the license file, increasing or decreasing the total amount of point-based currency available to the license file.

* * * * *